April 8, 1958

G. B. PITTS 2,829,785

INDUSTRIAL TRUCK

Filed Dec. 14, 1953

INVENTOR.

George B. Pitts

April 8, 1958
G. B. PITTS
2,829,785
INDUSTRIAL TRUCK
Filed Dec. 14, 1953
4 Sheets-Sheet 2
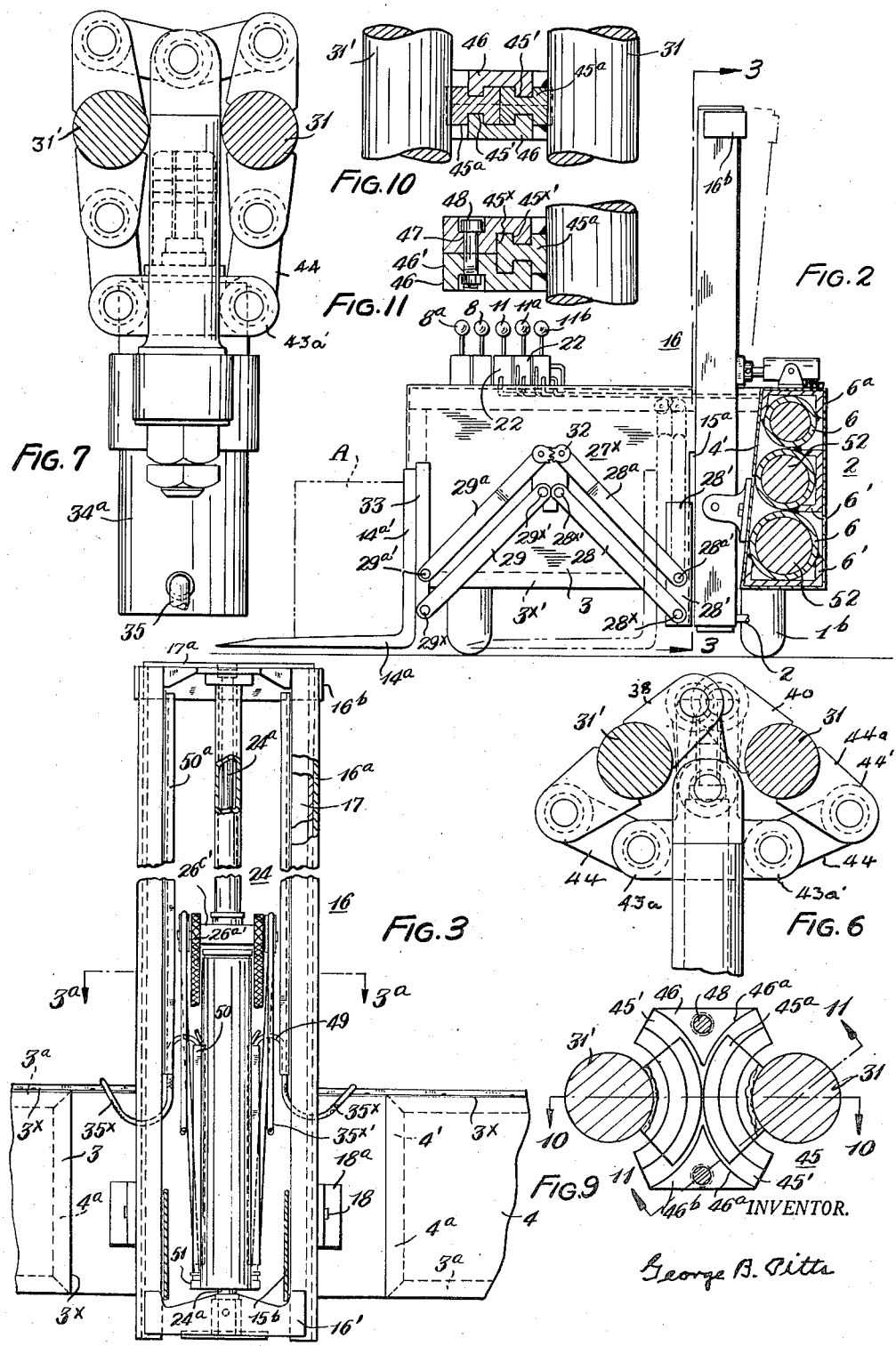
INVENTOR.
George B. Pitts April 8, 1958     G. B. PITTS     2,829,785
INDUSTRIAL TRUCK
Filed Dec. 14, 1953     4 Sheets-Sheet 4
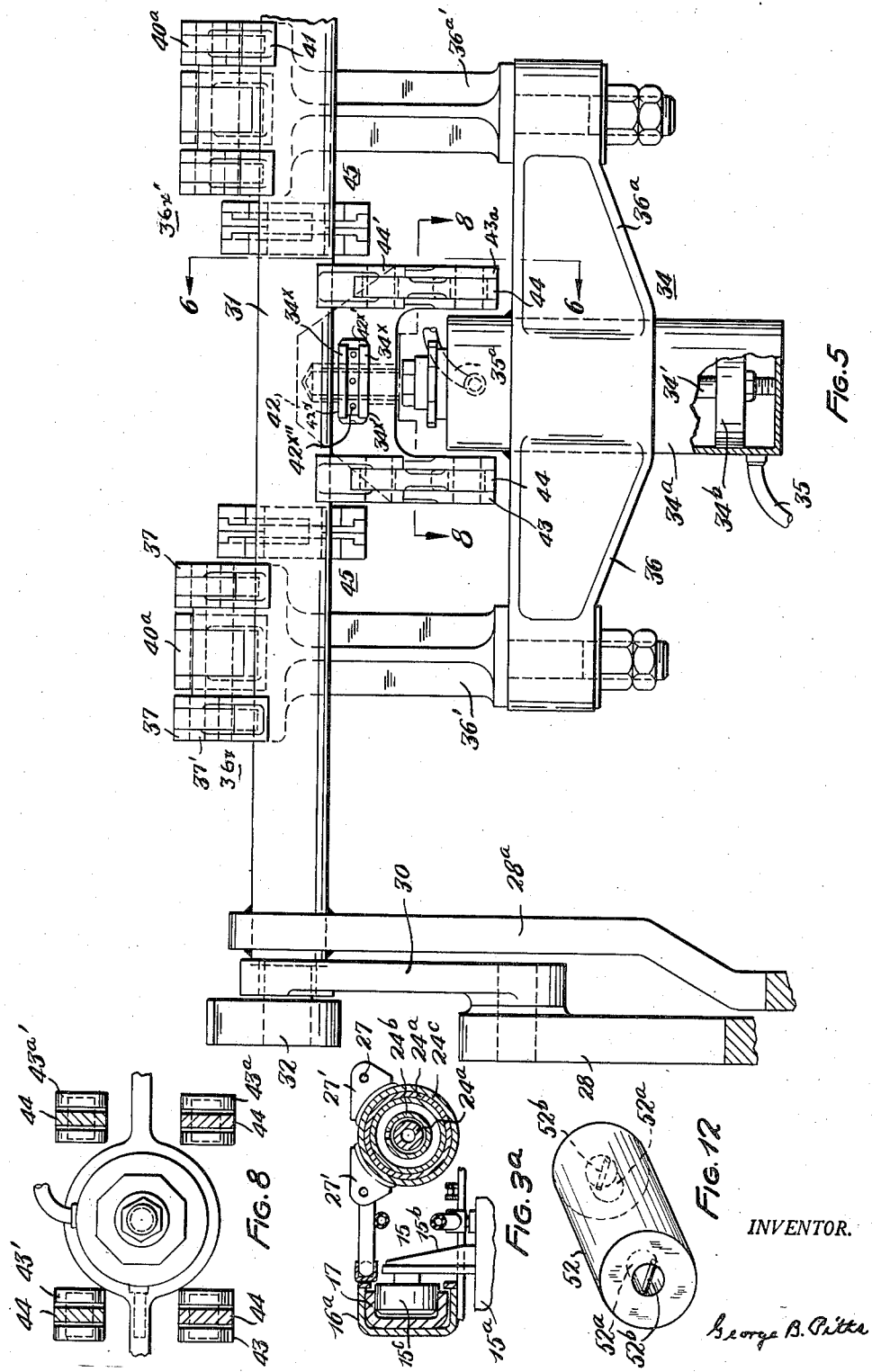
INVENTOR.
George B. Pitts

United States Patent Office 2,829,785
Patented Apr. 8, 1958

2,829,785

INDUSTRIAL TRUCK

George B. Pitts, Cleveland Heights, Ohio, assignor, by mesne assignments, to Otis Elevator Company, New York, N. Y., a corporation of New Jersey Application December 14, 1953, Serial No. 397,933

9 Claims. (Cl. 214—75)

This invention relates to an industrial truck having a mechanism thereon for picking up, raising, lowering and transporting loads and discharging the latter. The invention is directed to a form of construction wherein the truck frame consists of a longitudinal side structure rigidly connected to spaced forward and rearward sections, which provide between them an opening (that is, an opening extending inwardly from that side of the frame opposite the side structure) wherein is mounted a load raising and handling mechanism. The load raising and handling mechanism includes raisable means for an elevating member, which supports a load carrier adapted to be positioned within the opening inwardly of the outer end thereof and operable outwardly beyond the outer end of the opening in all positions of the elevating member, whereby loading and unloading of loads may take place at ground or elevated levels, and when a load is picked up it may be raised to a selected level and transported and thereafter discharged at ground or elevated levels. In this form of construction the truck is adapted for carrying out loading, unloading, stacking and de-stacking operations in limited areas, such as aisles, freight cars, cargo planes and warehouses, too small or narrow for the employment of trucks having load handling mechanisms mounted at one end thereof. Also, it will be observed that loads of undue length, such as lumber, metals, pipes, cylinders, bars and the like may be handled and transported in a ready and rapid manner and economically.

In trucks of the elevating type having a load mechanism at one end of the truck frame, the truck is driven endwise forwardly to pick up a load and driven endwise rearwardly to discharge the load, thereby requiring a large area to carry out these operations, whereas in the form of construction disclosed herein these operations may be carried out in limited areas, as the load carrier is operated, relative to the truck frame, laterally outwardly beyond one side thereof and after a load is picked up the load carrier may be raised or first moved inwardly and raised and also tilted inwardly. Where the load to be handled consists of one or more members, which exceed the width of the opening between the front and rear frame sections, the load carrier is moved outwardly, the load is picked up and raised to a selected level above these sections and then moved into position within the opening. The load carrier may then be tilted and transportation of the load effected or it may be lowered to position the load on the top walls of the front and rear frame members and then transported. The construction is simplified in that the raising means for the elevating member is mounted in the opening and the load carrier is mounted on the elevating member for movement outwardly and inwardly relative thereto and thereby eliminates a separate support, on which the load support is slidably mounted, fixed to and movable with the elevating member. Due to the fact that the load carrier, when positioned to pick up a load or discharge a load, is disposed outwardly at one side of the truck frame, the weight of the load tends to tilt the truck frame on the adjacent front and rear wheels; in trucks of which I have knowledge, tilting of the truck frame was overcome by providing extensible jacks, which engage the ground or other surface at opposite sides of the extended load carrier. To simplify the construction and eliminate danger of tilting the truck frame, provision is made herein to counterbalance the load during pick-up or dischage thereof.

One object of the invention is to provide an improved elevating truck wherein the load raising and carrying mechanism is mounted in an opening extending inwardly of one side of the truck frame.

Another object of the invention is to provide an improved industrial elevating truck one longitudinal side of the truck frame being formed with an opening in which a load raising and carrying mechanism is mounted, the mechanism including a load carrier movable outwardly beyond the opening for picking up and discharging loads at ground or elevated levels.

Another object of the invention is to provide an improved elevating truck, the frame being constructed to provide intermediate its forward and rearward ends an opening in which a load raising and handling mechanism is tiltably supported.

A further object of the invention is to provide an improved elevating truck the frame of which is shaped to form at one side an inwardly extending opening arranged to accommodate a load raising and handling mechanism having a load support movable transversely to a position outwardly of the opening for picking up and discharging loads and wherein provision is made to counterbalance the load on the load support, when the latter is in the outward position.

Other objects and advantages of the invention will be apparent to those skilled in the art to which my invention relates from the following description taken in connection with the accompanying drawings, wherein Fig. 1 is a plan view of an industrial truck embodying my invention, parts being broken away;

Fig. 2 is a section on the line 2—2 of Fig. 1, but showing the load carrier in its outer position;

Fig. 3 is a view partly in side elevation and partly in section on the line 3—3 of Fig. 2;

Fig. 3a is a fragmentary section on the line 3a—3a of Fig. 3;

Fig. 5 is a section on the line 5—5 of Fig. 4;

Fig. 6 is a fragmentary section on the line 6—6 of Fig. 5;

Fig. 7 is a section similar to Fig. 6, but showing the parts in their inner or normal position, as shown in Fig. 1;

Fig. 8 is a section on the line 8—8 of Fig. 5;

Fig. 9 is a section on the line 9—9 of Fig. 5;

Fig. 10 is a section on the line 10—10 of Fig. 9;

Fig. 11 is a fragmentary section on the line 11—11 of Fig. 9; and

Fig. 12 is a perspective detail view showing a weight.

Figure 1:
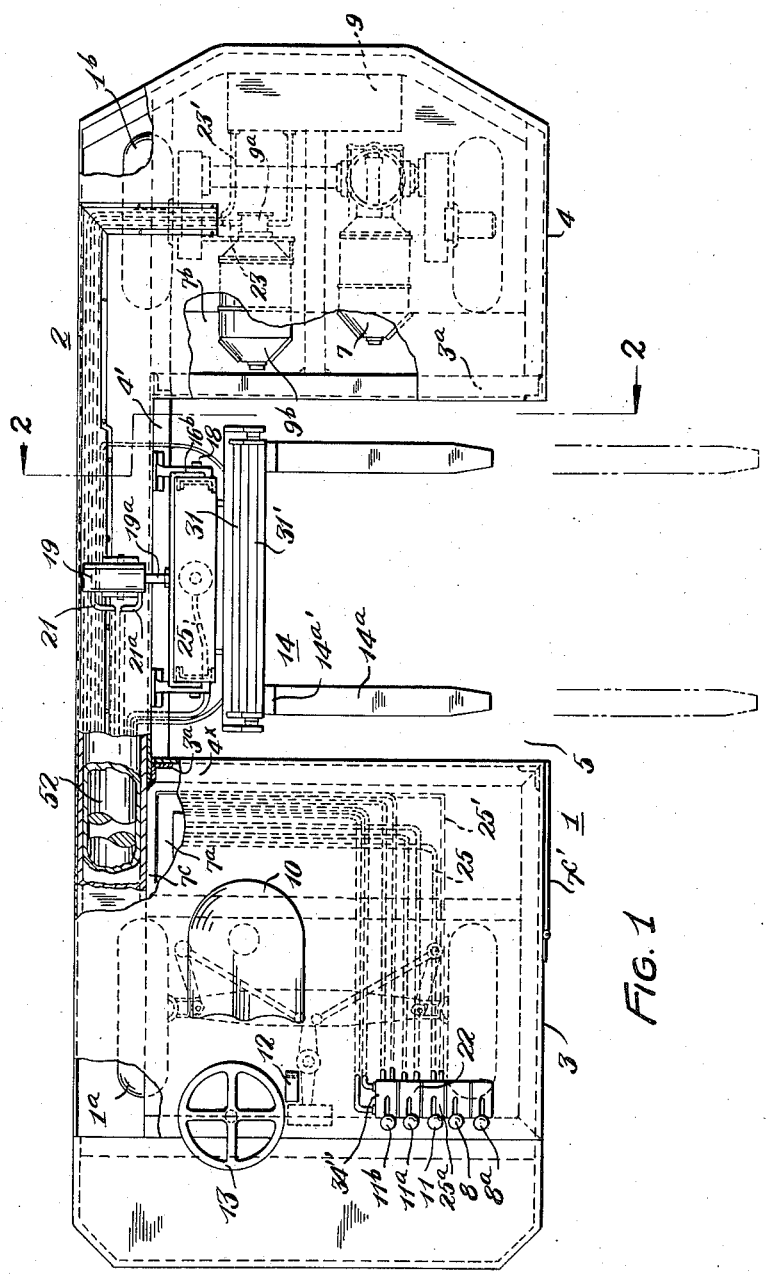
Figure 4:
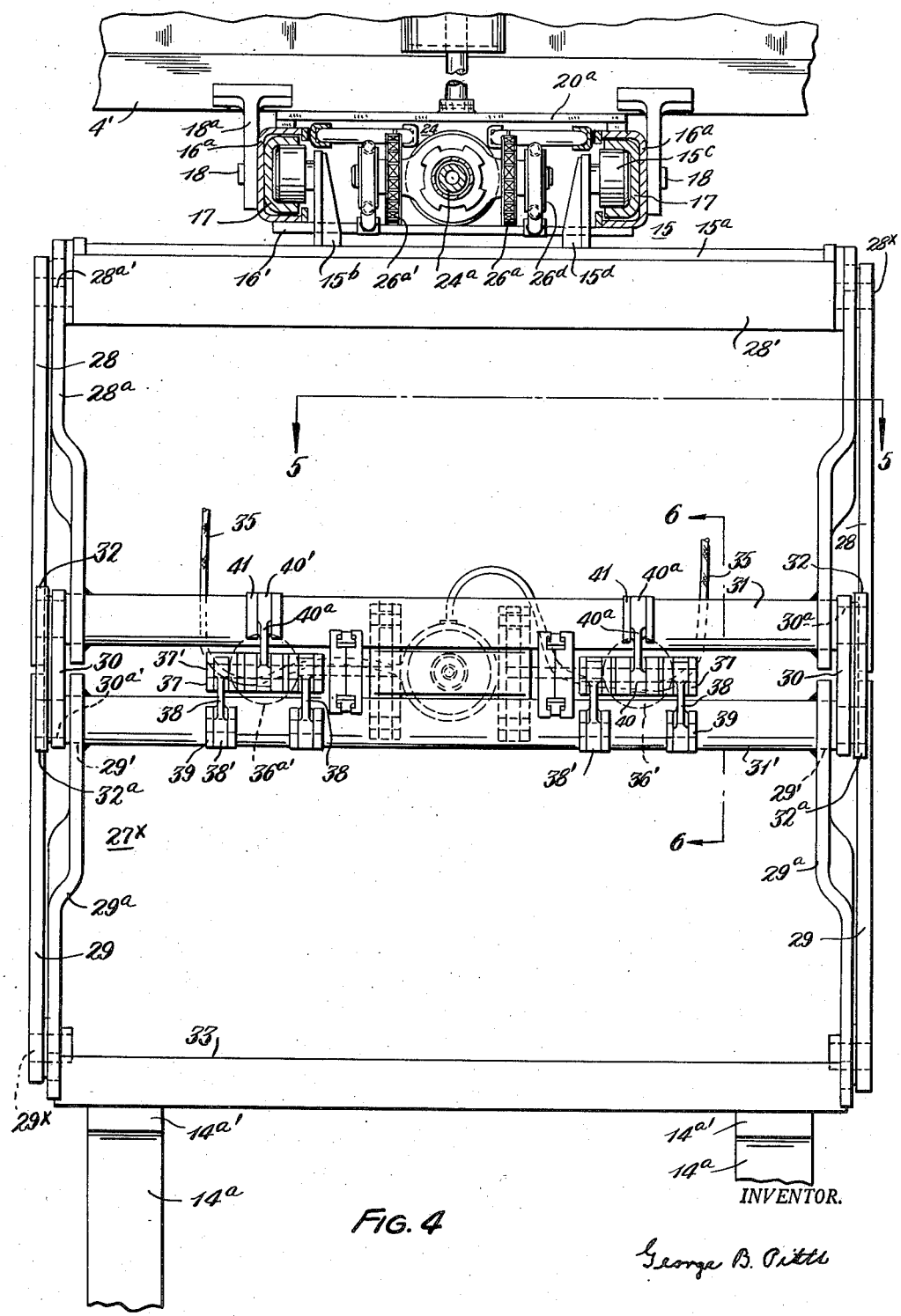
Fig. 4 is a section on the line 4—4 of Fig. 2, enlarged.

In the drawings, 1 indicates as an entirety a frame mounted on a pair of front dirigible wheels 1a and a pair of rear traction wheels 1b. The frame 1 comprises a rigid structure providing a side wall 2 extending longitudinally from end to end and at one side thereof and front and rear spaced frame members 3, 4, respectively, rigidly secured to the side member 2 and forming an opening 5 defined by the opposed walls of frame members 3, 4, and inner wall 4' of the side member 2. The side member 2 consists of a plurality of large tubes 6 (preferably in superimposed relation) extending longitudinally of the frame 1 and reinforced by elongated channels 6', each of the latter being welded to one of the tubes, the welds for the channel secured to the intermediate tube serving to weld the walls of the tubes together, whereby is provided a unitary rigid structure, to which the front and rear frame members 3, 4, are rigidly secured and maintained in fixed relation to resist stresses on the latter during translation of the truck in either direction for transporting a load, as later described. The upper tube 6 extends substantially from end to end of the side member 2, whereas the lower tube and intermediate tube extend longitudinally of the side member between the adjacent front and rear wheels 1a, 1b. The tubes 6 and channels 6' are enclosed in and fixed to the walls of a suitable housing 6a, the opposite end walls of which, above the plane of the intermediate tube 6, are open for a purpose later set forth. The front and rear frame members 3, 4, are provided with top walls 3x preferably disposed in the plane of the top wall of the housing 6a; also, the sides of the front and rear frame members are preferably provided with walls 3x'. The walls of each of the frame members 3, 4, are reinforced (a) by horizontal and vertical angles 3a, 4a, respectively, welded to the tops, bottoms and side walls of the frame members 3, 4, and (b) by the adjacent ends of adjoining angles being welded together by angle 4x. As shown in Figs. 1, 2 and 4, the inner wall 4' of the housing 6a (which wall forms the inner wall of the opening 5) between the opposed side walls of the frame members 3, 4, is inclined upwardly and outwardly for a purpose later set forth. The traction wheels 1b may be driven by an internal combustion engine, but for purposes of illustration I show an electrically driven motor 7 drivingly connected to the wheels 1b and supplied with electric current from a battery 7a, the circuit (not shown) for the motor being controlled by levers 8, 8a; the lever 8 controls the speed of the motor 7, whereas the lever 8a controls the direction of rotation of the motor. The motor 7 is supported on a base 7b suitably secured to the adjacent angles 3a and braced by a strut 7b' connected at its outer end to the inner side wall of a reservoir 9, which is later referred to. The front frame member 3 is provided with a compartment 7c within which the battery 7a is removably mounted, access to the compartment being provided by a hinged door 7c'.

It will be understood that either frame member 3, 4, may serve as the forward or front end of the truck, so that reference to the frame member 3 as the front or forward frame member does not nor is intended to constitute a limitation. This frame member 3 is therefore shown as the front end of the truck and provides a driver's station having a seat 10, the levers 8, 8a, for controlling the operation of the motor 7 in either direction, levers 11, 11a, 11b, for controlling the supply of fluid under pressure from a fluid supply system (which includes the reservoir 9, a pump 9a and motor 9b for driving the pump mounted on the base 7b), for purposes later set forth, a service brake pedal 12 and a steering device 13, as well as other conventional devices (not shown).

14 indicates as an entirety a load carrier mounted on an elevating member 15, which in turn is mounted on guide means 16 for movement vertically to selected levels, whereby loads may be picked up, raised and lowered, transported, stacked and destacked and discharged. The guide means 16 consist of outer guides 16a, fixed at their lower ends to a base 16' and preferably connected together at the upper ends by a U-member 16b, and inner guides 17 mounted on the outer guides 16a for movement endwise thereof and connected together at their upper ends by a cross member 17a. The outer guides 16a are mounted on the frame 1 by means of suitable trunnions 18 fulcrummed on brackets 18a fixed to the inner wall 4', this mounting serving to provide for the tilting of the guides 16a and all parts mounted thereon inwardly and outwardly relative to their vertical position, as is customary in trucks of the elevating type, the wall 4' being inclined to accommodate the guides 16a when the latter are tilted inwardly. The means for tilting the guides 16a preferably consist of a cylinder 19, preferably fulcrummed mounted on the top wall of the housing 6a and provided with a reciprocatable piston operating through a rod 19a which is pivotally connected to a plate 20a fixed to the guides 16a. The cylinder 19 is provided at its opposite ends with connections for hoses 21, 21a, leading to a valve 22 which is operated by a lever 11a; fluid pressure is supplied to the valve 22 through a pipe 23 leading from the pump 9a and fluid is discharged from the valve 22 through pipe 23a to the reservoir 9. In one position of the lever 11a the valve 22 simultaneously connects the fluid pressure supply pipe 23 to the pipe 21 and the pipe 21a to fluid discharge pipe 23' to operate the piston in the cylinder 19 in one direction, whereas when the lever 11a is operated to its other position the connections with the valve 22 for the fluid pressure supply to and fluid discharge from the cylinder 19 are reversed to move the piston therein in the opposite direction.

The elevating member 15 consists of the following: 15a indicates a transverse wall on which the load carrier 14 is mounted. The wall 15a is provided with spaced rearwardly extending brackets 15b, each provided adjacent its upper and lower ends with outwardly extending stud shafts on which rollers 15c are rotatably mounted, the rollers having engagement with the side walls of the inner guides 17 to movably support the elevating member 15 on the latter, whereby the latter may be raised by a suitable mechanism 24 preferably of the fluid pressure supply type. The mechanism 24 may comprise a single cylinder mounted on the base 16' and a piston therein operatively connected to the elevating member, but preferably, as shown, the mechanism consists of a tubular member 24a mounted on its lower end on the base 16' and extending upwardly therefrom approximately to the height of the guides 16a. 24b, 24c, 24d, indicate inner, outer and intermediate cylinders, respectively, concentrically related to each other and the tubular member 24a. The inner and outer cylinders 24b, 24d, are spacedly connected at their lower ends and spacers or glands being provided between the intermediate cylinder and adjacent walls of the cylinders 24b, 24c. The walls of the tubular member and inner cylinder 24b are formed with communicating fluid ports and the lower end of the tubular member is connected with a conduit 25 leading from a valve 25a which is operated by the lever 11. The valve 25a is adapted to be connected with the fluid pressure supply pipe 23, in one position of the lever 11, whereby the fluid pressure is supplied to the spaces between the cylinders 24b, 24c, 24d, the effect of which is to initially raise the intermediate cylinder 24d. The cylinder 24d is provided with a cross head 26 supporting at diametrical opposite sides thereof sprockets 26a over which chains 26a' are trained. The inner ends of the chains are provided with rods 27 suitably anchored (preferably on lugs 27' fixed to the outer cylinder 24c), whereas their outer ends are suitably connected to the elevating member 15. Accordingly the upward movement of the cylinder 24d raises the elevating member and carrier relative to the guides 16a and 17 to the upper ends of the latter or to any selected intermediate level. However, upon upward movement of the elevating member to the upper end of the guides 17, if the supply of fluid pressure is continued, the pressure is applied to the cross member 17a, which is connected to the upper ends of the guides 17, to raise the latter and thus position the carrier at any selected higher level or within the limit of movement of the guides 17 relative to the guides 16a. Operation of the lever 11 to its other position releases the fluid pressure and connects the valve to a conduit 25' and through a connection (not shown) with the pipe 23', the fluid flows to the reservoir, so that the elevated parts gravitate to normal position as shown in Figs. 2 and 3. The mechanism 24 is preferably similar in construction and operation to the disclosure shown in Letters Patent No. 2,641,366 to Clarence W. Chanda, for which reason it is not more fully illustrated and described herein.

The load carrier 14 is mounted on the elevating member and includes load engaging and supporting means, shown for exemplification purposes as a pair of spaced forks 14a, 14a, and operating connections, indicated as an entirety at 27x, between the elevating member 15 and the forks 14a, whereby the latter may be moved from a position within the opening 5 to a position outwardly of the latter and the frame members 3, 4, whereby (a) loads at one side of the frame 1 may be engaged and raised and moved to a position within the opening 5 and (b) the forks 14 with a load thereon may be moved to a position outwardly of the opening 5 and frame members 3, 4, for discharging the load. The connections 27x' consist of the following: 28, 28a, indicate spaced, transversely alined pairs of inner links and 29, 29a, indicate spaced, transversely alined pairs of outer links, the inner ends of the pairs of links being articulatably connected together and relatively operated, as later set forth. The links 28 are pivotally mounted at their outer ends on the outer sides and near the lower ends of the side walls of a frame 28' (which is suitably fixed to the wall 15a) on alined axes 28x and their inner ends are pivotally connected on alined axes 28x' on the outer sides of bridge plates 30, whereas the outer ends of the links 28a are pivotally mounted on the outer sides of the side walls of the frame 28' on alined axes 28a' above the pivots 28x for the links 28, and the inner end portion of each link 28a is formed with a through opening through which extends the adjacent end portion of a rocker 31. The links 28a are fixed (preferably welded) to the rocker 31. As shown in Fig. 4, the opposite end portions of the rocker 31, outwardly of the links 28a, are preferably reduced and each rotatably extends through an opening 30a formed in the adjacent bridge plate 30 above the pivotal connection 28x' of the adjacent link 28 therewith, and outwardly of the bridge plate the reduced end of the rocker 31 is provided with a member 32, preferably consisting of a hub, a portion of the side wall of which is provided with gear elements disposed on an arc concentric to the axis of the rocker 31.

The outer ends of the links 29 are pivotally connected on alined axes 29x to the opposite sides and adjacent the lower end of an upright member 33, and their inner ends are pivotally connected at 29x' on the outer sides of the bridge plates 30, the axes of the pivotal connections 28x', 29x', being disposed in a horizontal plane. The outer ends of the links 29a are pivotally connected on alined axes at 29a' to the opposite sides of the member 33 above the connections 29x of the links 29 therewith, whereas the inner end portion of each link 29a is formed with a through opening 29' through which extends the adjacent end portion of a rocket 31'. The link 29a is fixed (preferably welded) to the rocket 31'.

As shown in Fig. 4, the opposite end portions of the rocker 31' are preferably reduced and each rotatably extends through an opening 30a' formed in the adjacent bridge plate 30 above the pivotal connection 29x' of the adjacent link 29 therewith, and outwardly of the bridge plate the reduced end of the rocker 31' is provided with a member 32a preferably consisting of a hub, a portion of the side wall of which is provided with gear elements disposed on an arc concentric to the axis of the rocker 31' and in mesh with the gear elements on the adjacent hub 32, as shown in Fig. 2, the axes of the rockers 31, 31', being disposed in a horizontal plane and the gear elements on the hubs 32, 32a, being in engagement to insure rotative movement of the rockers 31, 31', equal angular distances during operation of the inner and outer pairs of links 28—28a, 29—29a, in either direction. From the foregoing description it will be observed that each of the inner pairs of links 28, 28a, and each of the outer pairs of links 29, 29a, constitute parallel levers, so that when the inner pairs of links and outer pairs of links are relatively moved, as later set forth, the member 33 is moved horizontally, outwardly and inwardly by a power mechanism 34.

It will also be observed that the pivotal connections 28a' for the links 28a and the pivotal connections 29a' for the links 29a are above and offset laterally outwardly with respect to the pivotal connections 28x, 29x, respectively; by reason of such arrangement of pivotal connections the member 33 is supported in a vertical position and maintained in such position and the forks in a horizontal position during movement of the member 33 outwardly and inwardly.

As will later be apparent, the rockers 31, 31', bridge plates 30, a power mechanism 34 and linkages between the latter and the rockers provide articulatable connections between the inner ends of the pairs of links 28—28a, 29—29a, whereby the said pairs of links are relatively movable to and from an expanded position to operate the member 33 outwardly, to pick up or discharge loads and inwardly into a collapsed relation, as shown in Fig. 1.

As shown in Figs. 1, 2 and 4, the forks 14a are provided at their inner ends with upwardly extending legs 14a' which are removably secured to the outer side of the upright member 3 in any desired manner.

The power mechanism 34 consists of a cylinder 34a having therein a reciprocatable piston 34b connected to a rod 34'. The cylinder 34a is provided with connections adjacent its opposite ends for fluid supply pipes 35, 35a, the supply of fluid pressure through either pipe to the cylinder 34a and discharge of the fluid from the latter through the other pipe being controlled by a valve 34" (Fig. 1), which is operated by the lever 11b. The cylinder 34a, the axis of which is disposed midway of the rockers 31, 31', is provided below the latter with diametrically related outwardly extending supports 36, 36a, on which are mounted posts 36', 36a', respectively. Connections 36x, 36x', are provided between the posts and the rockers 31, 31'; these connections being similar in construction, reference to one thereof is made (but like parts of the other connections are identified by the same reference characters) as follows: 37 indicates alined spaced pairs of knuckles on the upper end of the post 36'. A pivot pin 37' extends through (a) the alined knuckles 37 and the alined knuckles on the inner ends of spaced links 38, the outer ends of which are provided with knuckles 38' pivotally mounted on spaced pairs of lugs 39, respectively, fixed to one side of the adjacent rocker 31' (Fig. 4) and (b) a knuckle 40 on the inner end of an intermediate link 40a, the outer end of which is provided with a knuckle 40' pivotally mounted on a pair of lugs 41 fixed to one side of the rocker 31 (Fig. 4); that is, that side corresponding to the side of the rocker 31' to which the lugs 39 are fixed.

42 indicates a plate disposed vertically and parallel to and between the rockers 31, 31', the plate 42 intermediate its ends being operatively connected to the piston rod 34' by devices 34x (later referred to) mounted in a recess 34x' formed in the plate 42. The plate 42 extends laterally to the opposite sides of the cylinder 34a. The opposite end portions of the plate 42 extend downwardly and terminate at each side of the cylinder 34a with alined pairs of knuckles 43—43', 43a—43a' (Figs. 5 and 8) in which are pivotally mounted the adjacent ends of links 44, respectively. The opposite end of each link 44 is disposed between and pivotally connected to a pair of knuckles 44' provided on the outer end of a link 44a, the inner end of which is fixed to the adjacent rocker, as shown in Fig. 6. As shown in Figs. 6 and 7, the links 44a are fixed to corresponding sides of the rockers 31, 31', but diametrically of the sides of the latter, respectively, to which the lugs 39, 41, are fixed.

From the foregoing description it will be noted (a) that the cylinder 34a is operatively connected through the sets of links 38, lugs 39, links 40a, lugs 41 to the upper sides of the rockers 31, 31', as viewed in Fig. 4 whereas (b) the piston rod 34' is operatively connected through links 44 and links 44a to the lower sides of the rockers 31, 31', as shown in Fig. 5. Accordingly, when fluid pressure is supplied through the pipe 35 to the lower end of the cylinder 34a below the piston 34b the rocket 31 is rotated counterclockwise and the rocker 31' is rotated clockwise, as viewed in Fig. 6, whereby the pairs of links 28, 28a, swing away from the frame 28' and the pairs of links 29, 29a, swing outwardly relative to the pairs of links 28, 28a, as shown in Figs. 2 and 4, to move the member 33 outwardly. Likewise, when fluid pressure is supplied through pipe 35a to the upper end of the cylinder 34a above the piston 34b the rocker 31 is rotated clockwise and the rocker 31' is rotated counterclockwise, whereby the pairs of links 28—28a, 29—29a, are retracted to move the member 33 inwardly to the position shown in Fig. 1.

From the foregoing description it will be noted that a single cylinder-piston unit is employed and the applied power thereof to operate the pairs of links 28—28a, 29—29a, in either direction is due to the reaction between the piston 34b and one of the heads of the cylinder 34a, dependent upon the direction the pusher 33 is to be moved.

The devices 34x, which connect the piston rod 34' and plate 42 together consist of upper and lower collars 42x, 42x', respectively, loosely surrounding the piston rod and having inner annular concave surfaces and an intermediate member 42x" the opposite faces of which are of convex shape and complementary to the inner concave surfaces of the collars 42x, 42x'. The opposite outer faces of the collars 42x, 42x', engage the upper and lower walls of the opening 34x'; that is, the marginal portions of these walls which form the openings through which the piston rod 34b' extends. The intermediate member 42x" is screw threaded on the piston rod 34b' for adjustment endwise of the latter whereby the relation of piston rod to the plate 42 may be changed, the effect of which is to insure operation of the rockers in either direction a predetermined distance to completely retract the pairs of links or move the member 33 outwardly to a predetermined position. The spherical surfaces of the members 42x, 42x', and 42x" serve to maintain the knuckles 43—43', 43a—43a', links 44 and links 44a in alinement to insure free operation thereof. The side walls of the member 42x" are formed with recess whereby a spanner or the like may be employed to rotate it.

45, 45, indicate auxiliary connections between the rockers 31, 31', at opposite sides of the cylinder 34a. These connections serve to prevent flexing of the rockers 31, 31', intermediate their opposite ends to maintain them in parallel relation, whereby danger of the connections between the cylinder 34a and rockers 31, 31', and between the piston rod 34b' and the rockers 31, 31', becoming disalined during or resulting from repeated operations of the links 28—28a and 29—29a is avoided. Each connection 45 consists of (a) a pair of arcuate members 45a the the inner side walls of which have a curvature corresponding to that of rockers 31, 31', and are suitably fixed (preferably welded) to and movable with the latter, respectively, and (b) fixedly related members 46 disposed upon opposite sides of the arcuate members 45a and having interlocking relation therewith to connect the rockers 31, 31', together without affecting the relative rotative movements of the latter, as already set forth. The members 46 are similar in construction, their opposite end portions being formed with alined through openings 47 through which extends bolts 48 (the bolt heads and nuts being preferably countersunk) to clamp the members 46 together. The opposite faces of each member 45a are provided with inner and outer spaced curvilinear walls 45x, 45x', concentrically related to the axis of the adjacent rocker and forming between them, from end to end of the member 45a, arcuate recesses or guide-ways 45'. The opposite side walls 46' of the members 46 are of arcuate shape, concentric to the axes of the rockers 31, 31', and provided on their opposed faces adjacent to the side walls 46' with inwardly extending, alined walls 46a (which are also concentric with the axes of the rockers 31, 31') which extend into the guide-ways 45' and serve as guides for the members 45a. The opposed faces of the members 46, between and spaced from the terminating end portions of the walls 46a provide pads 46b, which are in engagement when the members are secured together by the bolts 48. The pads 46b are disposed in planes inwardly of the top surfaces of the walls 46a and walls 45x, 45x', whereby the arcuate members 45a are free to oscillate with the rockers 31, 31'. As shown, the opposite side walls of the pads 46b are curvilinearly shaped concentric to the axes of the rockers 31, 31', and cooperate with the walls 46a to provide guides for the outer curvilinear walls of the members 45a.

From the foregoing description it will be observed that as the arcuate members 45a are fixed to the rockers 31, 31', and move therewith relative to each other and are provided with arcuate walls in slidable interlocking relation with arcuate walls on the opposed faces of the members 46, the intermediate portions of the rockers 31, 31', are connected together to prevent flexing thereof due to the operations of the pairs of links 28—28a, 29—29a.

By reason of the fact that the carrier 14 is moved upwardly and downwardly and the cylinder 34a is mounted on the carrier, the outer sections of the respective fluid flow pipes 35, 35a, which are connected to the cylinder 34a consist of flexible hose, which reeve on separate pulleys 26d, respectively, carried by the cross-head 26c' for movement therewith, as later set forth.

The pipes 35, 35a, preferably comprise metallic conduit portions leading from the valve 34" and flexible portions (hoses) leading to the cylinder 34a. Each of the latter portions consist of inner and outer flexible hose sections 35x, 35x', respectively, which permits each inner section 35x to be readily positioned, as later set forth, in which operation a loop and the oppositely extending contiguous portions thereof are put under resilient or spring tension and tend to expand outwardly in opposite directions. As shown, the oppositely extending contiguous portions of the loop 49 of hose section 35x for the conduit 35 form inner and outer legs which are seated under pressure in a pair of transversely alined, parallel, elongated seats 50, 50a, respectively (each of U-shape in cross section), the openings in the latter being in opposed relation. The seats 50, 50a, of each pair have a predetermined spaced relation, so that when the loop legs are positioned therein the intermediate portion (which forms the loop 49) is put under tension, the effect of which is to exert pressure outwardly on and maintain the legs in the adjacent seats 50, 50a. Each seat 50a extends from the upper end of the adjacent guide 16a downwardly into overlapping relation to the seat 50. The bottom wall of the seat 50a is suitably fixed to a retainer strip for the inner guide 17, which strip in turn is suitably fixed to the edge of the outer side wall of the adjacent guide 16a whereas each seat 50 extends longitudinally of and is suitably fixed to the outer wall of the cylinder 24c and moves therewith. As shown, the loop 49 is initially disposed at a level above the base 16' to provide the hose leg of sufficient length to compensate for the movement of guides 17 upwardly relative to the guides 16a to the higher level previously referred to. The seat 50 for the inner hose leg is substantially co-extensive in length to the latter. The outer end of the inner hose section 35x is detachably connected to a fitting (not shown) which is connected to the wall of the cylinder 24c adjacent to and in alinement with the lower end of the adjacent seat 50. The fitting is connected through a nipple to a separate fitting 51, the latter in turn being detachably connected to the inner end of the outer section of the hose 35x'. The hose section 35x' extends upwardly from the fitting 51 independently of the adjacent chain 26a and is trained over the adjacent pulley 26d rotatable on the shaft for the adjacent sprocket 26a and extends downwardly from the pulley independently of the adjacent chain and sprocket for connection to one end of the cylinder 34a. As will be observed, the hose sections 35x, 35x', connected to the pipe 35a are similarly mounted as above set forth.

The hose sections 35x are initially positioned as shown in Fig. 3 in which position the loop legs remain in the seats 50—50a, 50—50a, during movement of the elevating member 15 and carrier 14 upwardly to a level corresponding to the upper ends of the guides 16a. If the supply of fluid pressure to the tubular member 24a is continued, the cylinders 24b, 24c, 24d, and guides 17 will be moved upwardly, thereby moving the carrier to a higher level, and contiguous portions of the loop legs will disengage the seats 50, and through the progressive looping thereof, progressively engage the seats 50a. In the downward movement of the guides 17 and cylinders 24b, 24c, 24d, to the position shown in Fig. 3, the contiguous portions of the loop legs will progressively disengage the seats 50a and progressively re-engage the seats 50, the resiliency of the progressively formed loops during these movements serving to maintain the loop legs in the seats 50—50a, 50—50a.

Means are provided for counter-balancing a load A on the carrier 14 when the latter is in its extended position, as shown in Figs. 2 and 4; that is, when a load is picked up and if it is raised prior to movement of the carrier to its innermost or normal position or where a load is to be discharged. The counter-balancing means consist of weights formed of ponderous material and carried by the side frame 2. As shown, the spaces within the tubes 6 are utilized to accommodate the weights 52, which consist of sections of the material to facilitate handling thereof and slidably fitting the inner walls of the tubes 6, whereby the sections may be readily positioned or removed. The number of sections 52 employed will depend upon the capacity of the truck. By preference, the opposite end walls of the housing 6a are removable to provide access to the tubes 6, whereby the number of weights therein may be increased or decreased to meet various operating circumstances. As shown in Fig. 12, the opposite ends of each weight 52 may be formed with an inwardly extending recess 52 in which is suitably mounted a device, such as a cross-rod 52b, adapted to be engaged by a hook on the inner end of a bar or rod (not shown) to facilitate removal of the weights, the bar or rod being also adapted to slide the weights into endwise related position in each tube.

To those skilled in the art to which my invention relates, many changes in construction and widely differing embodiments and applications thereof will be apparent without departing from the spirit of the invention. My disclosures and the description herein are purely illustrative and not intended to be in any sense limiting.

What I claim is:

1. A truck comprising a wheel mounted chassis comprising a longitudinal frame structure and forwardly and rearwardly spaced transverse frame structures rigidly connected to said longitudinal frame structure and forming an opening therebetween, a load handling mechanism including longitudinally spaced upright guides, means for supporting said spaced upright guides in said opening, an elevating member provided with inwardly extending brackets, rollers on said brackets engaging said guides to movably support said elevating member on the latter, means for raising said elevating member, a load supporting device, inner and outer pairs of parallel related members carried by said elevating member and connected to said load supporting device for supporting the latter for movement transversely outwardly beyond said opening and inwardly within said opening, and hydraulically operated means for moving said pairs of parallel related members outwardly and inwardly.

2. A truck as claimed in claim 1 wherein said hydraulically operated means are mounted on said parallel related members.

3. A truck comprising a wheel mounted chassis comprising a longitudinal frame structure and forwardly and rearwardly spaced transverse frame structures rigidly connected to said longitudinal structure and forming an opening therebetween, a load handling mechanism, means for supporting said mechanism in said opening, said mechanism comprising spaced upright guides, inner and outer vertically disposed members, inwardly extending brackets mounted on said inner vertical member and provided with rollers engaging said guides to movably support said inner vertical member on the latter, a load supporting device mounted on said outer vertical member, inner and outer pairs of parallel related members between and connected to said inner and outer vertical members for moving said outer vertical member transversely of said chassis outwardly beyond said opening and inwardly, and means for moving said pairs of parallel related members outwardly and inwardly.

4. A truck comprising a wheel supported chassis comprising a longitudinal side structure and forward and rearwardly spaced frames rigidly secured to said side structure and forming an opening therebetween, a load handling mechanism, means for supporting said mechanism within said opening, said mechanism consisting of spaced guides, an elevating member movably supported on said guides, means for raising said elevating member, a horizontally disposed load supporting device, inner and outer pairs of parallel related members between and operatively connected to said elevating member and said device for supporting the latter for movement transversely outwardly beyond the outer end of said opening and inwardly thereof, and means for swinging said pairs of parallel related members outwardly and inwardly.

5. A truck as claimed in claim 4 wherein said swinging means are carried by said inner and outer pairs of members and operatively connected thereto, respectively.

6. In a truck, a wheel supported chassis comprising a longitudinal frame structure and a transverse frame structure rigidly secured to said longitudinal frame structure and forming a side opening in said chassis, an upright mast structure having a pair of longitudinally spaced generally vertical guides, means pivotally connecting said mast structure to said chassis adjacent to said longitudinal frame structures for movement about an axis substantially parallel with said longitudinal frame structure and fixed against movement transversely thereof, an elevatable member movably supported on said guides, means for raising said elevatable member, an extendable and contractable supporting arm having one end connected to said elevatable member such that the arm is extendable and contractable transversely of said chassis, a load supporting device connected to the other end of said arm, and fluid pressure actuated means for extending and contracting said supporting arm to move said load supporting device transversely of said chassis outwardly beyond the outer end of said opening and inwardly thereof.

7. In a truck, a wheel supported chassis comprising a longitudinal frame structure and forwardly and rearwardly spaced transverse frame structures rigidly secured to said longitudinal frame structure and forming therebetween a side opening in said chassis, a mast structure having a pair of longitudinally spaced generally vertical guides, means pivotally connecting said mast structure to said chassis adjacent to said longitudinal frame structure for movement about an axis substantially parallel with said longitudinal frame structure and fixed against movement transversely thereof, an elevatable member movably supported on said guides, means for raising said elevatable member, an extendable and contractable supporting arm having one end connected to said elevatable member, said arm being extendable and contractable transversely of said chassis, a load supporting device connected to the other end of said arm, and fluid pressure actuated means for extending and contracting said supporting arm to move said load supporting device transversely of said chassis outwardly beyond the outer end of said opening and inwardly thereof.

8. In a truck, a wheel supported chassis comprising a longitudinal frame structure and a transverse frame structure rigidly secured to said longitudinal frame structure and forming a side opening in said chassis, a mast structure having a pair of longitudinally spaced generally vertical guides, means pivotally connecting said mast structure to said chassis adjacent to said longitudinal frame structures for movement about an axis substantially parallel with said longitudinal frame structure and fixed against movement transversely thereof, an elevatable member movably supported on said guides, means for raising said elevatable member, an extendable and contractable supporting arm including pairs of parallel related members, means connecting one end of said arm to said elevatable member such that the said arm is extendable and contractable transversely of said chassis, a load supporting device connected to the other end of said arm, and fluid pressure actuated means for moving said parallel related members to extend and contract said supporting arm to move said load supporting device transversely of said chassis outwardly beyond the outer end of said opening and inwardly thereof.

9. In a truck, a wheel supported chassis comprising a longitudinal frame structure and a transverse frame structure rigidly secured to said longitudinal frame structure and forming a side opening in said chassis, an upright mast structure having a pair of longitudinally spaced generally vertical guides, means pivotally connecting said mast structure to said chassis adjacent to said longitudinal frame structures for movement about an axis substantially parallel with said longitudinal frame structure and fixed against movement transversely thereof, an elevatable member movably supported on said guides, means for raising said elevatable member, an extendable and contractable supporting arm having one end connected to said elevatable member such that the arm is extendable and contractable transversely of said chassis, a load supporting device connected to the other end of said arm, and power actuated means for extending and contracting said supporting arm to move said load supporting device transversely of said chassis outwardly beyond the outer end of said opening and inwardly thereof.

References Cited in the file of this patent

UNITED STATES PATENTS

| Number | Name | Date |
|---|---|---|
| 1,985,285 | Erdahl | Dec. 25, 1934 |
| 2,270,664 | Weaver | Jan. 20, 1942 |
| 2,591,544 | Hegarty | Apr. 1, 1952 |
| 2,619,241 | Jessen | Nov. 25, 1952 |
| 2,621,811 | Lull | Dec. 16, 1952 |
| 2,672,249 | Ulinski | Mar. 16, 1954 |
| 2,709,017 | Ulinski | May 24, 1955 |
| 2,720,993 | Lull | Oct. 18, 1955 |
| 2,752,058 | Gibson | June 26, 1956 |